May 8, 1956     H. G. FLEISCHHAUER     2,744,541
AUTOMATIC CONTROLLING DEVICE FOR BRANCH PIPE LINES
Original Filed June 23, 1948
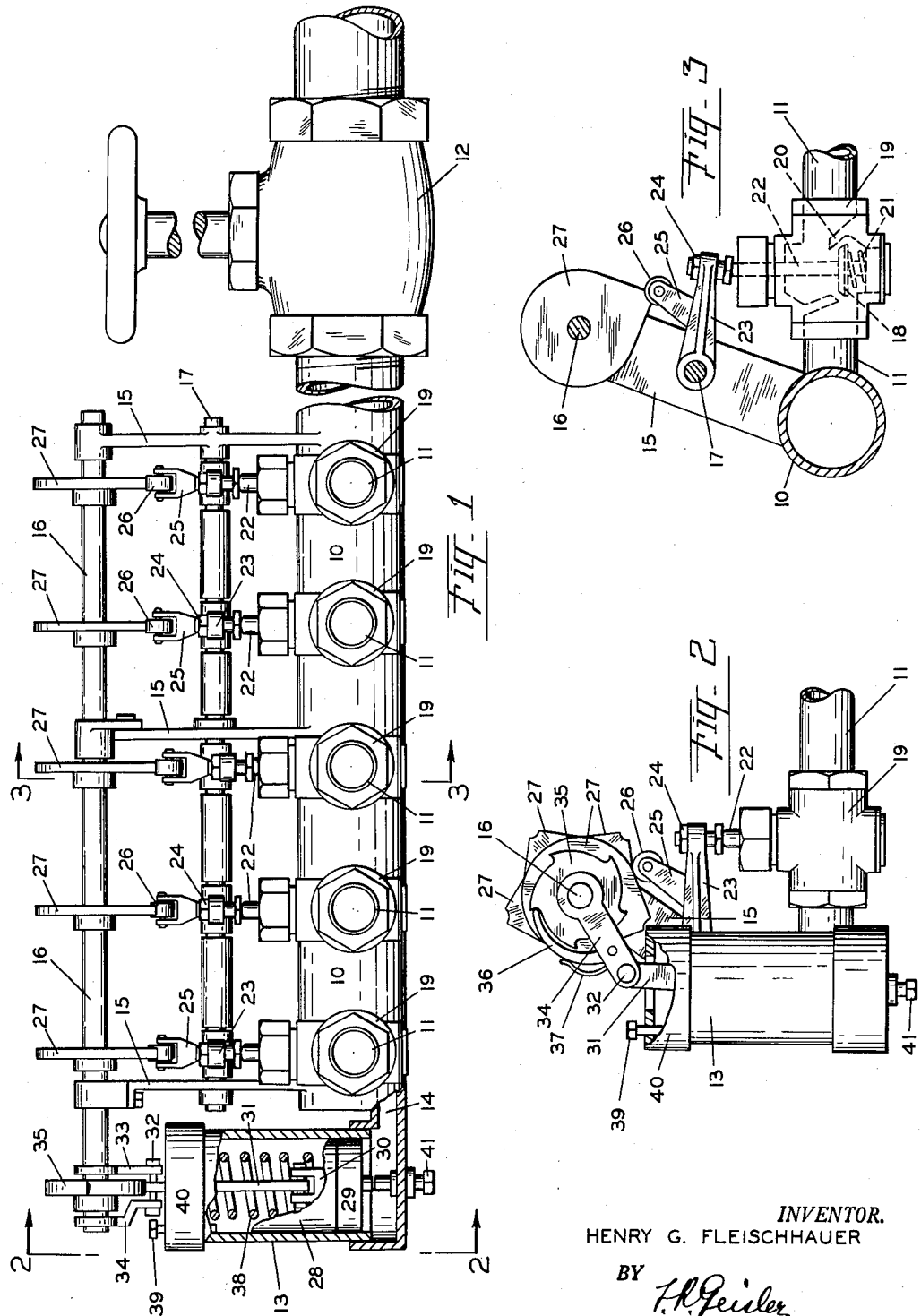
*INVENTOR.*
HENRY G. FLEISCHHAUER
BY
ATTORNEY

United States Patent Office 2,744,541
Patented May 8, 1956

2,744,541

AUTOMATIC CONTROLLING DEVICE FOR BRANCH PIPE LINES

Henry G. Fleischhauer, Portland, Oreg.

Original application June 23, 1948, Serial No. 34,792, now Patent No. 2,641,280, dated June 9, 1953. Divided and this application May 26, 1953, Serial No. 357,543

2 Claims. (Cl. 137—627)

This application is a divisional application divided from my pending application Serial No. 34,792, now Patent No. 2,641,280, entitled "Automatic Control Valve for Branch Pipe Lines," which application was filed under date of June 23, 1948, and, like the invention described in the parent application, the invention in this present application relates in particular to irrigation or sprinkling installations in which the water is supplied from a main service pipe through a plurality of branch pipes, and where, due to insufficient supply and pressure, it is not desirable to permit the water to pass through more than one branch pipe or group of branch pipes at a time. For example, in sprinkling systems for lawns and the like, it is often necessary to arrange the system so that different sections are supplied by separate branch water pipe lines, each connected to the main water delivery pipe line, and to provide suitable control means to restrict the passage of the water through one branch pipe line at a time, and thereby enable the water to be used for irrigating or sprinkling each section in turn.

Various, more or less automatic, control means for operating sets of valves designed to serve such a purpose have been invented, but, to the best of my knowledge, these are too complicated and expensive for the average home owner or small gardener or small farmer. Furthermore, some of these depend upon electric timing devices which do not permit any variation in the predetermined length of sprinkling periods for different portions of the garden. Often it may be desirable to make comparative variations in the sprinkling periods so as to enable longer sprinkling to take place in one section of the lawn or garden and less sprinkling in another section on account of special conditions. Some of the complicated control means previously invented, in addition to being expensive to manufacture and install, also easily get out of order, and this is another reason why they have not met with more favor on the part of individual home owners or those engaged in farming and gardening on a small scale.

One of the objects of the present invention is to provide an improved control for branch pipe lines which will be automatically controlled by the turning on and off of the valve in the main pipe line (which main pipe line valve may be operated in any manner, thus manually, or by remote control, or by electrical, mechanical, or hydraulic means), and which will also be operated entirely by fluid pressure within the pipe line system.

Another object of this invention is to provide a practical branch pipe control means which will be partly automatic in its operation to the extent that delivery through each branch pipe successively will occur in predetermined order, but in which the length of the period of the permitted flow through each branch pipe can be varied as desired and will depend merely upon the control of the main pipe line valves.

I attain these objects with the employment of a device, hereinafter described, by means of which the turning on and off of the supply of fluid in the main supply pipe line will automatically result in the turning off of one branch pipe line and the turning on of another branch pipe line. In the following brief description reference is to be made to the accompanying drawings in which:

Fig. 1 is an elevation of the device, partly in section, the view being taken from the right with respect to Figs. 2 and 3;

Fig. 2 is an end elevation taken from the left of Fig. 1 and thus on the line 2—2 of Fig. 1; and Fig. 3 is a transverse section on line 3—3 of Fig. 1.

A plurality of branch pipe lines 11 (thus five branch pipe lines in the device as illustrated in Fig. 1) are connected to the end portion of the main supply pipe 10. The main supply pipe 10 has the main shut off valve, indicated at 12 in Fig. 1, positioned at any convenient location ahead of the branch pipe lines. It is to be understood that the main shut off valve 12 may be of any suitable construction and may be adapted for manual operation, or for operation by mechanical means including hydraulic means, or by electrical means including remote control means.

The end portions of the branch pipe lines 11, where these connect with the main pipe 10, are arranged in parallelism with each other, and spaced only short distances apart and preferably are equally spaced along the main pipe 10.

A hydraulic cylinder 13 is connected at its lower portion with the main pipe 10, as for example, by a connecting channel 14 (Fig. 1) leading from the pipe 10, the end of the pipe 10 being otherwise closed.

A plurality of brackets 15, integral with or welded to the pipe 10, extend upwardly parallel to each other. The upper ends of these brackets carry supporting bearings for a rotatable shaft 16. A second shaft 17 is rigidly secured in the brackets 15 below and parallel to the rotatable shaft 16.

Each of the branch pipe lines 11 has a valve 18 (indicated in broken lines in Fig. 3) positioned within a valve housing 19 and normally held in closed position against a valve seat 20 by a spring 21. Each valve 18 is adapted to be opened when pressed downwardly against the force of its spring 21. A valve stem 22 extends up from each valve 18 through the top of the valve housing 19, and the upper end of each valve stem 22 is connected to an arm 23.

Each of the arms 23 is pivotally mounted on the stationary shaft 17. Each arm 23 is formed with an eye which extends around the upper end of the corresponding valve stem 22 and which is adjustably held in contact with the valve stem by suitable adjustment nuts indicated at 24. Each arm 23 has an integral upper extension 25 which carries a roller 26 at its upper end.

A plurality of identical cam members 27, one for each of the branch pipes 11, each cam member having a cam projection, are secured on the shaft 16 in such position as to bear against the respective rollers 26. Thus each roller 26 serves as a cam follower for its associated cam member. These cam members 27, while identical in shape, are so positioned that the cam projections on the perimeters of the cam members will be staggered symmetrically. Consequently when the shaft 16 is rotated, the valves in the branch pipe lines 11 will be opened and closed in succession. The cam projections of the cam members 27 are positioned at equal rotational angularity with respect to each other, the angularity depending upon the number of cam members. In the device as illustrated in Fig. 1, where there are five branch pipes 11 and consequently five cam members 27, the cam projections of the cam members are positioned at angularity of 72° with respect to each other. As a result each of the branch pipe valves will be opened and closed once in turn during one rotation of the shaft 16.

A hydraulically operable piston 28 is slidably mounted in the hydraulic cylinder 13. The piston carries a suitable gasket or sealing ring 29 on its under side which is held in place by a washer and bolt. The upper end of the bolt, which extends up above the bottom wall of the piston is formed into a forked mounting 30 (Fig. 1) which supports a pivot pin to which the bottom end of a link 31 is connected. The link 31 (see also Fig. 2) extends up through a slot in the top cap 40 of the cylinder 13 and is connected to a pin 32 which is secured to and extends between a pair of spaced arms 33 and 34. The arms 33 and 34 are rotatably supported on the shaft 16.

A ratchet wheel 35 is secured on the shaft 16, by a set screw or other suitable means, and is located between the arms 33 and 34. The teeth on the perimeter of the ratchet wheel 35 are adapted to be engaged by a pawl 36 (see Fig. 2) pivotally secured between the arms 33 and 34. The pawl 36 is held in engagement with the ratchet wheel 35 by spring 37. The member of teeth on the ratchet wheel 35 corresponds to the number of branch pipes 11 and the number of cam members 27. A coil spring 38 is placed in the cylinder 13 and is held under compression between the upper face of the bottom of the piston 28 and the top cap 40 of the cylinder 13.

The operation of the device is as follows: When the shut off valve 12 of the supply pipe 10 is opened and the water (or other fluid) passes into the portion of the pipe 10 to which the branch pipes 11 are connected, a portion of the fluid will also pass into the bottom of the hydraulic cylinder 13 and the pressure of the fluid in the bottom of the cylinder 13 will be the same as the pressure in the main pipe 10. The pressure of the fluid in the cylinder 13 below the piston 28 will force the piston upwardly against the force of the spring 38, and this upward movement of the piston will result in partial rotation of the ratchet wheel 35 and with it of the shaft 16 and cam members 27 (thus a rotation of 72° in the device as illustrated, since the ratchet wheel has five teeth). This partial rotation of the shaft 16 and cam members 27 will cause the outlet valve in one of the branch pipes 11 to be closed and the valve in another branch pipe to be opened.

When the shut off valve 12 in the main pipe line is closed the pressure in the portion of the pipe 10 beyond the shut off valve 12 will drop since the open valve in the branch pipe remains open, and the pressure in the hydraulic cylinder 13 will also drop. The spring 38 will then return the piston 28 to its lower starting position. When the shut off valve 12 is again opened the operation is repeated, the upward movement of the piston 28 resulting in the closing of the previously opened valve in one of the branch pipe lines and the opening of a valve in another branch pipe line.

A set screw 39 in the top cap 40 of the hydraulic cylinder limits the upward travel of the piston and another set screw 41 in the bottom of the cylinder limits the downward travel of the piston. The extent to which the valves in the branch pipe lines will be opened consecutively can be independently adjusted, if desired, by adjustment of the nuts 24 on the valve stems 22.

I claim:

1. A device of the character described for controlling the passage of fluid from a main pipe into branch pipes successively, said device including a main delivery pipe, a shut-off valve for said main pipe, a plurality of branch pipes connected to said main pipe beyond said shut-off valve, said branch pipes spaced close together along said main pipe, a control valve in each of said branch pipes located near said main pipe, means connected with each of said control valves normally holding said control valves closed, a rotatable shaft located outside of said main pipe and said branch pipes, cam members carried by said shaft, means, including cam followers, connecting each of said cam members with said branch pipe control valves respectively, said cam members so positioned as to operate successively and serially to open their respective control valves as said shaft is rotated, a ratchet wheel connected with said shaft, a cylinder, a piston within said cylinder, said cylinder connected to said main pipe and so arranged that fluid pressure in said cylinder will be the same as in that portion of said main pipe where said branch pipes are connected and will cause said piston to move in one direction when said shut-off valve is opened, spring means for returning said piston to starting position when said fluid pressure is relieved upon the closing of said shut-off valve, and a ratchet-engaging element operated by said piston and producing partial rotation of said ratchet wheel whenever said piston is moved by said fluid pressure, whereby when said piston is moved by said fluid pressure caused by the opening of said shut-off valve the resulting partial rotation of said ratchet wheel and said shaft will cause one of said control valves to be opened and a previously-opened valve to return to normal closed position.

2. A sprinkling control comprising a main delivery pipe, a shut-off valve for said main pipe, a plurality of branch pipes connected to said main pipe beyond said shut-off valve, said branch pipes spaced close together along said main pipe, a control valve in each of said branch pipes located near said main pipe, spring means in each of said branch pipes normally holding said control valves closed, a rotatable shaft journaled in brackets supported on said main pipe, cam members carried by said shaft, means, including cam followers, connecting each of said cam members with said branch pipe control valves respectively, said cam members so positioned as to operate successively and serially to open their respective control valves as said shaft is rotated, a ratchet wheel on the end of said shaft, a cylinder, a piston within said cylinder, said cylinder connected to said main pipe and so arranged that fluid pressure in said cylinder will be the same as in that portion of said main pipe where said branch pipes are connected and will cause said piston to move in one direction when said shut-off valve is opened, spring means for returning said piston to starting position when said fluid pressure is relieved upon the closing of said shut-off valve, a ratchet-engaging element operated by said piston and producing partial rotation of said ratchet wheel whenever said piston is moved by said fluid pressure, and means for adjusting the extent to which each control valve can be opened by the rotation of its actuating cam member, whereby when said piston is moved by said fluid pressure caused by the opening of said shut-off valve the resulting partial rotation of said ratchet wheel and said shaft will cause one of said control valves to be opened and a previously-opened valve to return to normal closed position.

References Cited in the file of this patent

UNITED STATES PATENTS

| | | |
|---|---|---|
| 1,652,845 | Vennum | Dec. 13, 1927 |
| 2,593,765 | Keefer | Apr. 22, 1952 |
| 2,641,280 | Fleischhauer | June 9, 1953 |